United States Patent
Gong

(10) Patent No.: US 10,180,584 B2
(45) Date of Patent: Jan. 15, 2019

(54) ANTI-SHAKE MECHANISM FOR LENS

(71) Applicant: UNION OPTECH CO., LTD., Zhongshan, Guangdong (CN)

(72) Inventor: Junqiang Gong, Guangdong (CN)

(73) Assignee: UNION OPTECH CO., LTD., Zhongshan (CN)

( * ) Notice: Subject to any disclaimer, the term of this patent is extended or adjusted under 35 U.S.C. 154(b) by 0 days.

(21) Appl. No.: 15/654,687

(22) Filed: Jul. 19, 2017

(65) Prior Publication Data

US 2018/0059432 A1 Mar. 1, 2018

(30) Foreign Application Priority Data

Aug. 24, 2016 (CN) .......................... 2016 1 0712138

(51) Int. Cl.
| | |
|---|---|
| *G03B 5/04* | (2006.01) |
| *G02B 27/64* | (2006.01) |
| *H04N 5/225* | (2006.01) |
| *H04N 5/232* | (2006.01) |
| *G03B 17/56* | (2006.01) |

(52) U.S. Cl.
CPC .............. *G02B 27/646* (2013.01); *G03B 5/04* (2013.01); *H04N 5/2253* (2013.01); *H04N 5/2254* (2013.01); *H04N 5/2257* (2013.01); *H04N 5/23287* (2013.01); *G03B 17/568* (2013.01); *H04N 5/2328* (2013.01)

(58) Field of Classification Search
CPC .................................................... G02B 27/646
See application file for complete search history.

(56) References Cited

U.S. PATENT DOCUMENTS

| | | | | |
|---|---|---|---|---|
| 7,496,288 B2* | 2/2009 | Seo | ...................... | G02B 27/646 |
| | | | | 348/208.99 |
| 7,778,536 B2* | 8/2010 | Okamura | ................ | G03B 5/02 |
| | | | | 348/208.4 |
| 7,826,733 B2* | 11/2010 | Huang | ................... | G03B 17/00 |
| | | | | 348/208.99 |
| 8,016,493 B2* | 9/2011 | Yokoyama | ............. | F16D 7/021 |
| | | | | 396/428 |
| 8,792,166 B2* | 7/2014 | Watanabe | ............... | G03B 5/02 |
| | | | | 359/554 |
| 2005/0232620 A1* | 10/2005 | Sun | ......................... | G02B 7/40 |
| | | | | 396/101 |
| 2010/0309323 A1* | 12/2010 | Shin | ..................... | G02B 27/646 |
| | | | | 348/208.4 |
| 2013/0162851 A1* | 6/2013 | Shikama | ................. | G03B 5/00 |
| | | | | 348/208.99 |

* cited by examiner

*Primary Examiner* — Clayton E. LaBalle
*Assistant Examiner* — Linda B Smith

(57) ABSTRACT

An anti-shake mechanism for a lens includes a movable mechanism that is disposed between a base and a cover and that can move relative to the base and the cover, where a sensor for sensing a displacement of the movable mechanism is disposed on the cover, a drive coil is disposed on the base opposite to a front side of the movable mechanism, a drive magnet set opposite to the drive coil is disposed on the movable mechanism, a ball that enables the movable mechanism to move relative to the base in a manner of keeping a distance from the base is disposed between the base and the movable mechanism, and a floating magnet capable of mutually attracting the drive magnet is disposed on a back side of the base.

9 Claims, 7 Drawing Sheets

ANTI-SHAKE MECHANISM FOR LENS

CROSS REFERENCE TO RELATED APPLICATIONS

The present application claims the benefit of Chinese Patent Application No. 201610712138.3 filed on Aug. 24, 2016. All the above are hereby incorporated by reference.

BACKGROUND

Technical Field

The present invention relates to the field of optical lens technologies, and in particular, to a novel anti-shake mechanism for a lens.

Related Art

In the field of optical lenses, anti-shake optical lenses become increasingly widely used in mobile framing devices in the fields such as sports cameras, drone aerial photography, and automobile monitoring. In a non-static environment, an optical device without an anti-shake function obtains shaking images, and cannot produce clear and fluent visual effects. In the field of mobile phones, currently, many companies have applied anti-shake mobile phones, and principles of the anti-shake mobile phones are consistent with those of the foregoing anti-shake optical lenses.

There are a great number of anti-shake types, and a final effect of the anti-shake types is correcting optically caused image jitters. The so-called same objective means that there are many implementation methods. Common methods are optical anti-shake, CCD anti-shake, and body anti-shake. Their implementation processes are roughly as follows: in a case of a shake, lighting of an image varies, an electronic gyroscope, that is, a sensing device of a lens core, senses a shake of a lens and transmits a shake signal to a processor, the processor drives a corresponding anti-shake apparatus according to an amplitude and a direction of the shake, and the anti-shake apparatus makes an adjustment, so that the lens or a CCD moves in an opposite direction, so as to correct a deviation of the image caused by the lighting variation.

Manners for implementing an anti-shake apparatus are also gradually diversified, mainly for optimizing anti-shake performance and also for adaptation to most occasions and extreme conditions. Therefore, some basic requirements, such as a service life, a high temperature limit, a low temperature limit, stability, and heat dissipation, are raised for the anti-shake apparatus. No matter which manner is used to implement an anti-shake apparatus, a result is optimizing performance of the apparatus.

An anti-shake product mainly implements a movement of a CCD or a lens on a horizontal plane. A guide shaft manner is generally used in conventional products, an anti-shake movable component moves on guide shafts, and two linear movements are nested together to form a movement on the horizontal plane. Implementation of this structure is complex, cooperation between structural components is relatively precise, and sliding friction exists between the movable component and the guide shafts, leading to heavy abrasion under a long-time work condition.

SUMMARY

An objective of the present invention is to overcome disadvantages in the prior art and provide a novel anti-shake mechanism for a lens, to reduce abrasion by replacing a guide shaft with a magnet.

The present invention is implemented by using the following technical solutions:

A novel anti-shake mechanism for a lens includes a movable mechanism that is disposed between a base and a cover and that can move relative to the base and the cover, where a sensor for sensing a displacement of the movable mechanism is disposed on the cover, a drive coil is disposed on the base opposite to a front side of the movable mechanism, a drive magnet set opposite to the drive coil is disposed on the movable mechanism, a ball that enables the movable mechanism to move relative to the base in a manner of keeping a distance from the base is disposed between the base and the movable mechanism, and a floating magnet capable of mutually attracting the drive magnet is disposed on a back side of the base.

In the novel anti-shake mechanism for a lens as stated above, the drive magnet set includes two drive magnets, south and north poles of the drive magnet are on two ends of the drive magnet in a thickness direction of the drive magnet, the two drive magnets are disposed side by side with opposite polarities on a same side, and south and north poles of the floating magnet are on two ends of the floating magnet in a length direction of the floating magnet.

In the novel anti-shake mechanism for a lens as stated above, there are four drive coils and four drive magnet sets, and correspondingly, there are also four floating magnets.

In the novel anti-shake mechanism for a lens as stated above, the movable mechanism includes a movable frame, a CCD mounted on the movable frame, and an FPC connected to the CCD, the CCD is disposed on the movable frame by using at least three nuts, one of the nuts is a fixed nut that locates a distance between the CCD and the movable frame, and elastic components capable of adjusting the distance between the CCD and the movable frame are disposed on the rest nuts.

In the novel anti-shake mechanism for a lens as stated above, the nuts capable of adjusting the distance are distributed on two sides of the CCD.

In the novel anti-shake mechanism for a lens as stated above, a folded edge for preventing the FPC from being pulled in a use process is pre-folded on the FPC.

In the novel anti-shake mechanism for a lens as stated above, a heat sink is disposed on the CCD.

In the novel anti-shake mechanism for a lens as stated above, an exhaust hole is provided at a mounting position for mounting the drive coil on the base.

In the novel anti-shake mechanism for a lens as stated above, a limiting structure for limiting the displacement of the movable mechanism is disposed on the base.

In the novel anti-shake mechanism for a lens as stated above, metal sheets in contact with the ball are respectively disposed on opposite surfaces of the base and the movable mechanism, the ball is sandwiched between the upper and lower metal sheets, and a surface, in contact with the ball, of the metal sheet is coated with a white lubricating layer.

As compared with the prior art, the present invention has the following advantages:

In the present invention, a guide shaft is replaced with a magnet. A magnet is mounted on both a movable component and a base, and at a certain distance, the movable component is attracted by the base. A structure for attraction and floating is simple, can be implemented at a low precision, and has high structural stability. A ceramic ball is mounted between the movable component and the base, and the ceramic ball makes the movable component always keep a certain distance from the base, so that the movable component may slide horizontally relative to the base. The ceramic ball between the movable component and the base is used as an intermediate medium to make rolling friction. A mechanism for limiting a horizontal position of the movable component is provided on the base, so that the movable component is prevented from deviating excessively far to cause the movable component to fall off from the anti-shake apparatus. The present invention has low friction loss, good temperature resistance performance, and a long service life.

DETAILED DESCRIPTION

Figure 1:
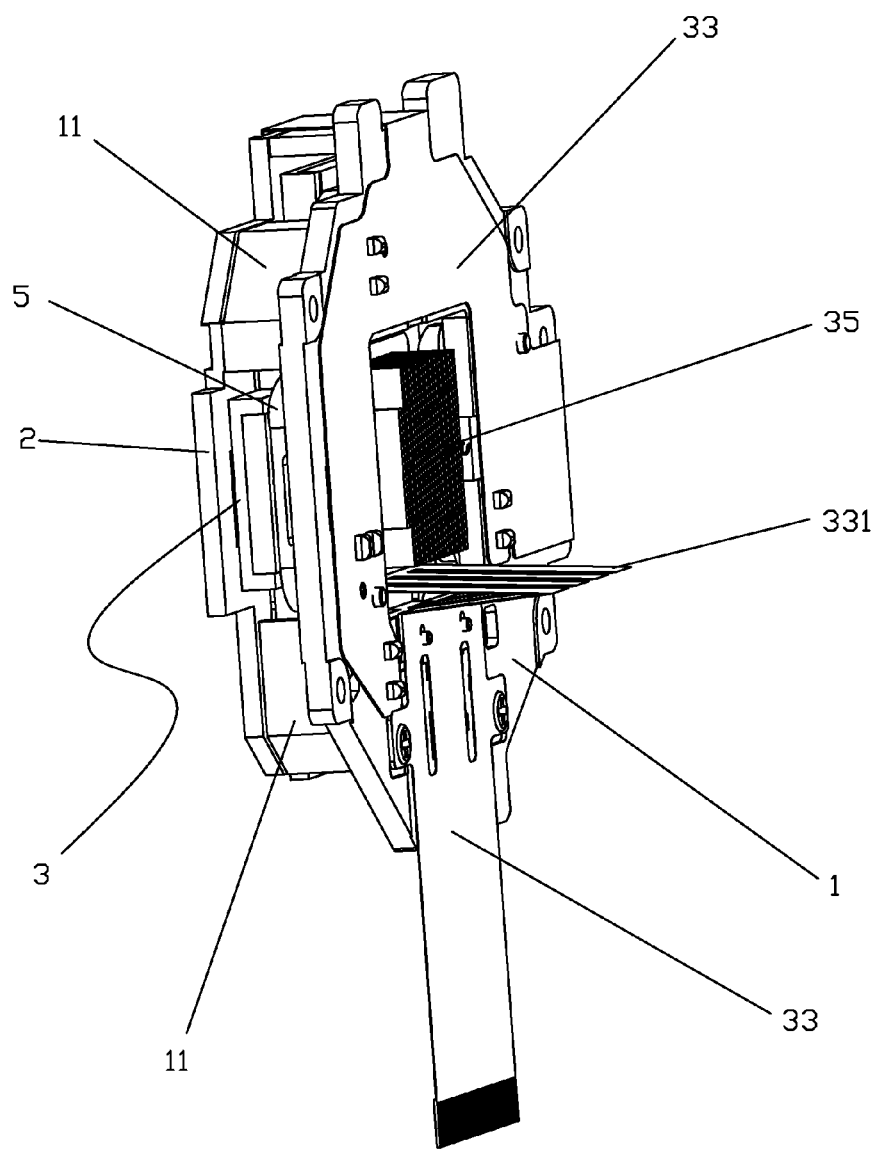
FIG. 1 is a schematic three-dimensional structural diagram 1 of the present invention.
Figure 2:
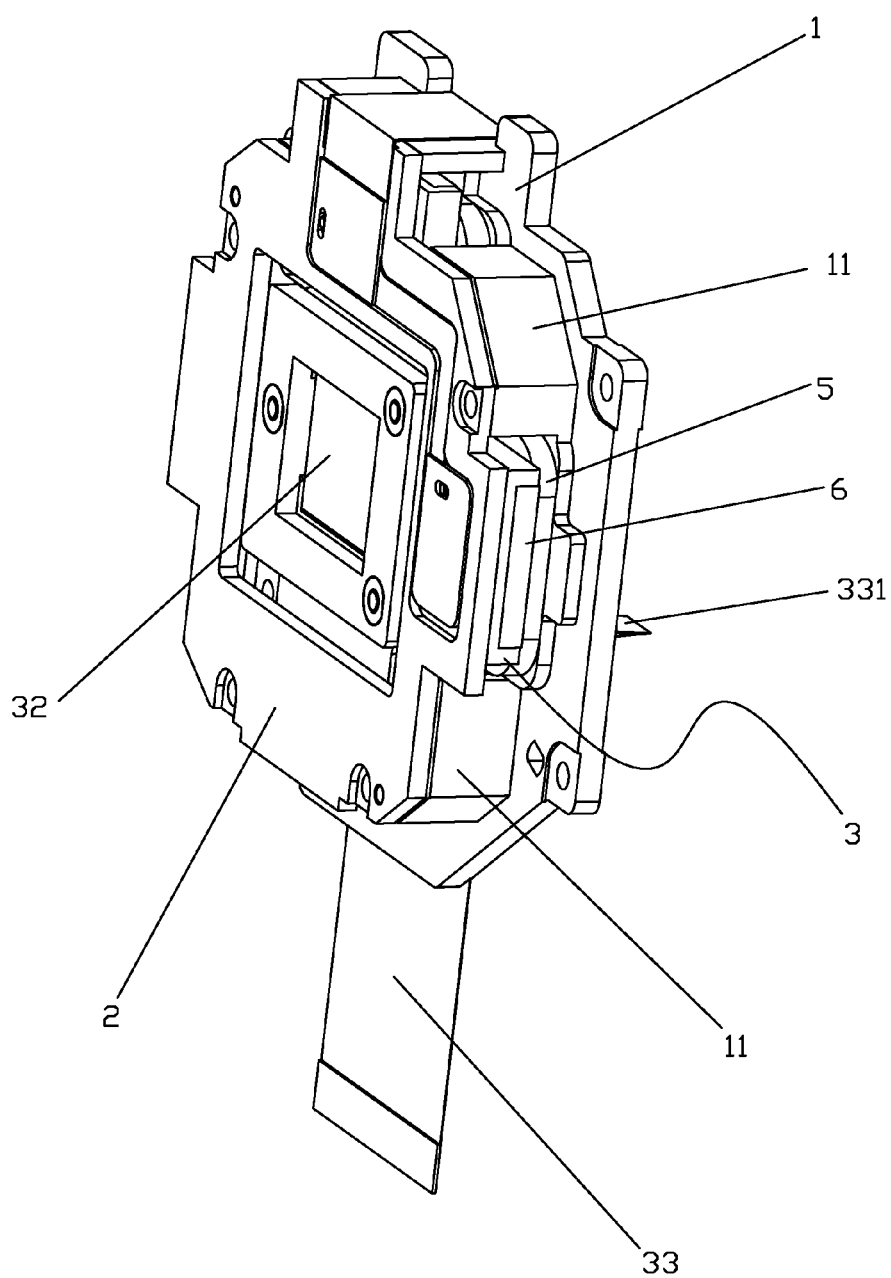
FIG. 2 is a schematic three-dimensional structural diagram 2 of the present invention.
Figure 3:
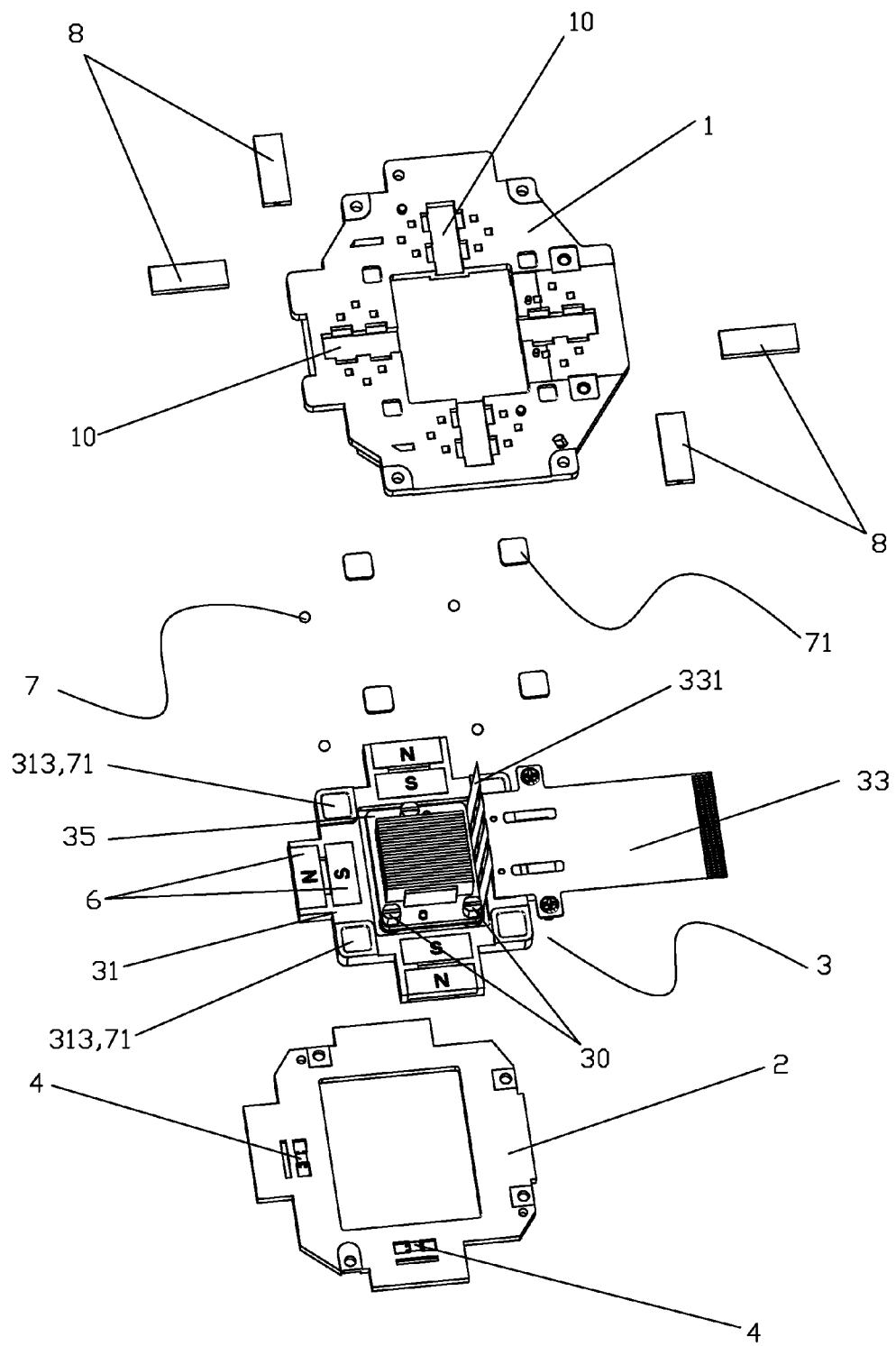
FIG. 3 is a schematic breakdown structural diagram 1 of a base, a movable component, and a cover of the present invention.
Figure 4:
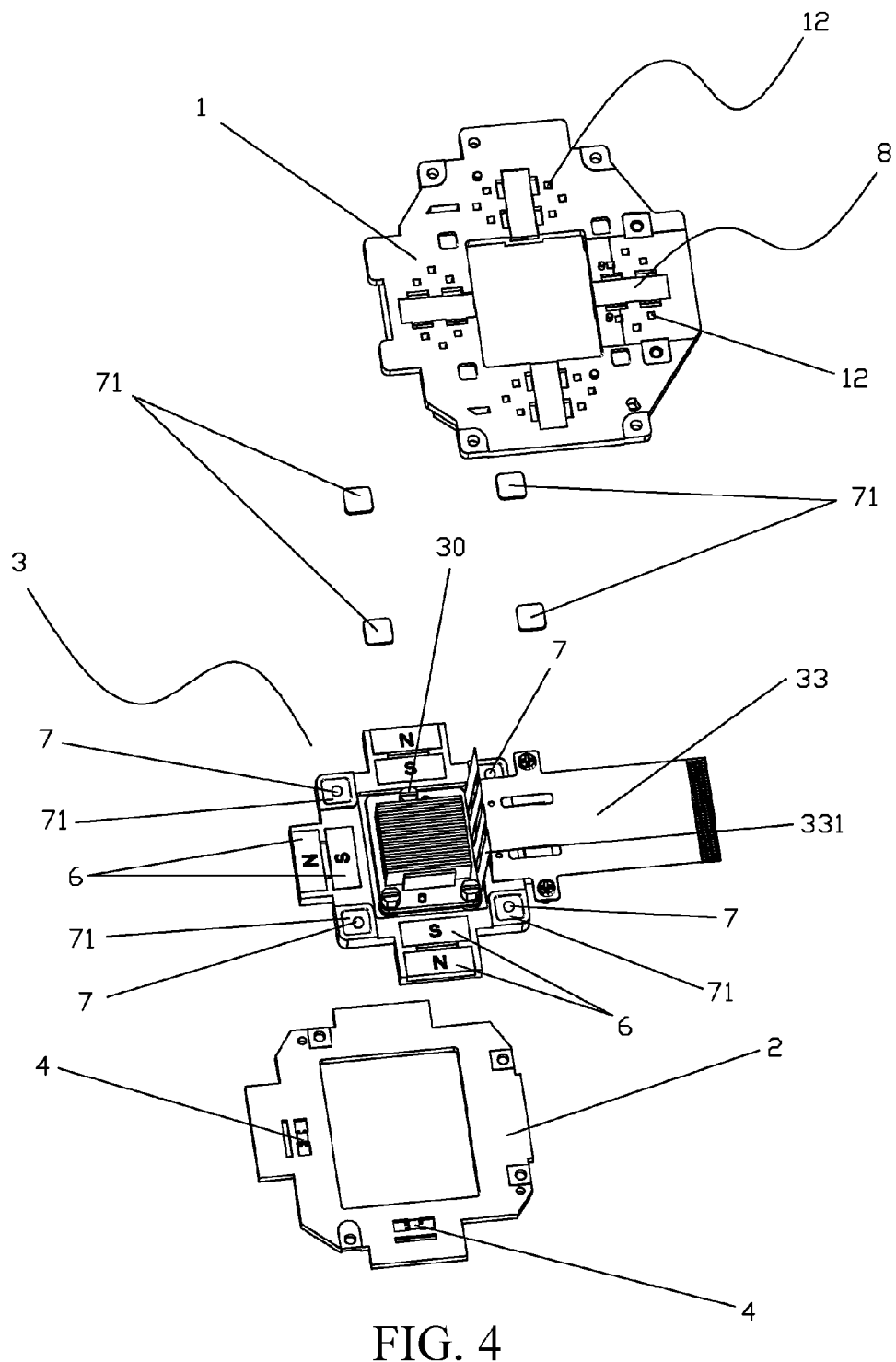
FIG. 4 is a schematic breakdown structural diagram 2 of a base, a movable component, and a cover of the present invention.
Figure 5:
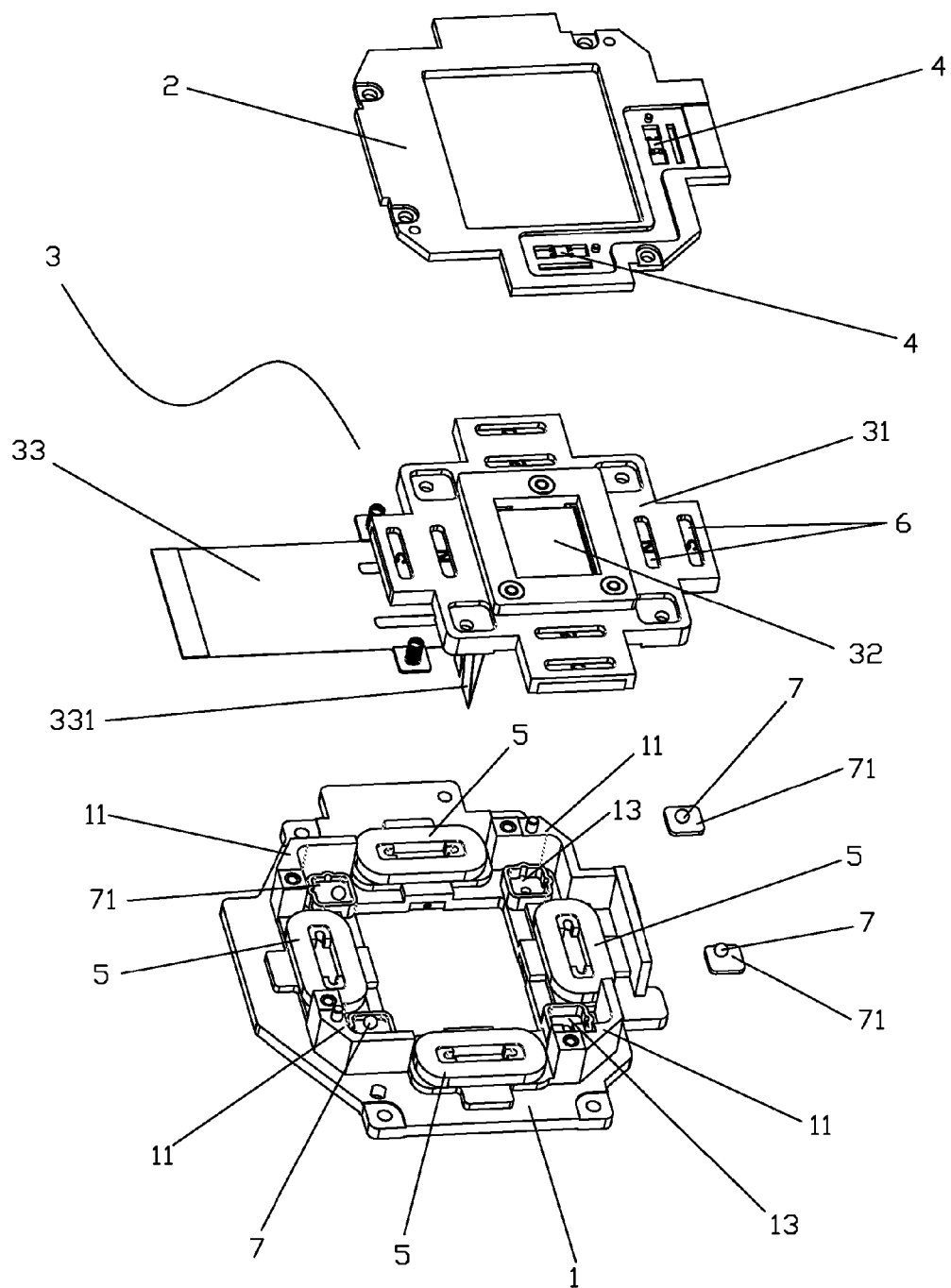
FIG. 5 is a schematic breakdown structural diagram 3 of a base, a movable component, and a cover of the present invention.
Figure 6:
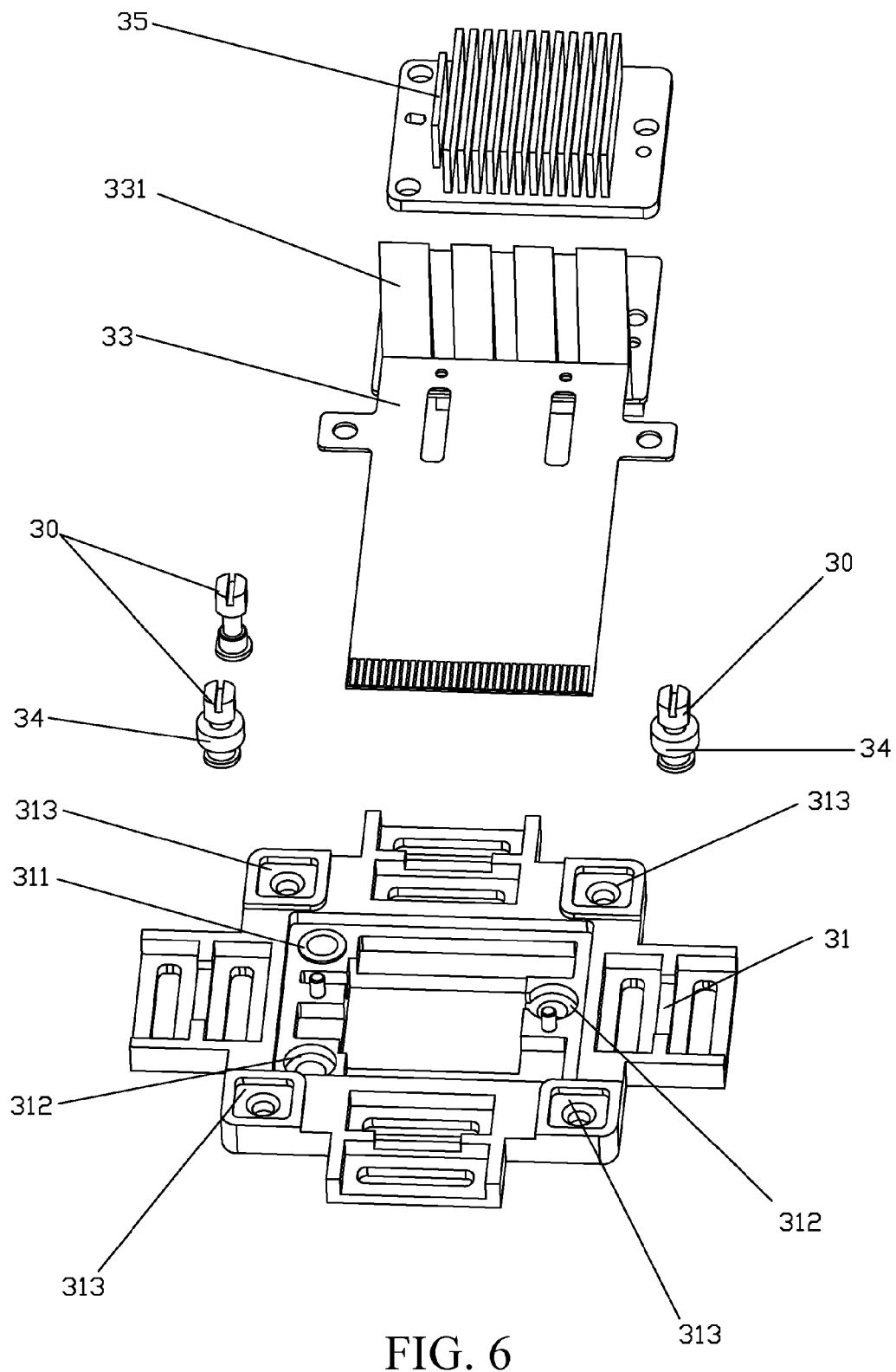
FIG. 6 is a schematic exploded structural diagram of a movable component.
Figure 7:
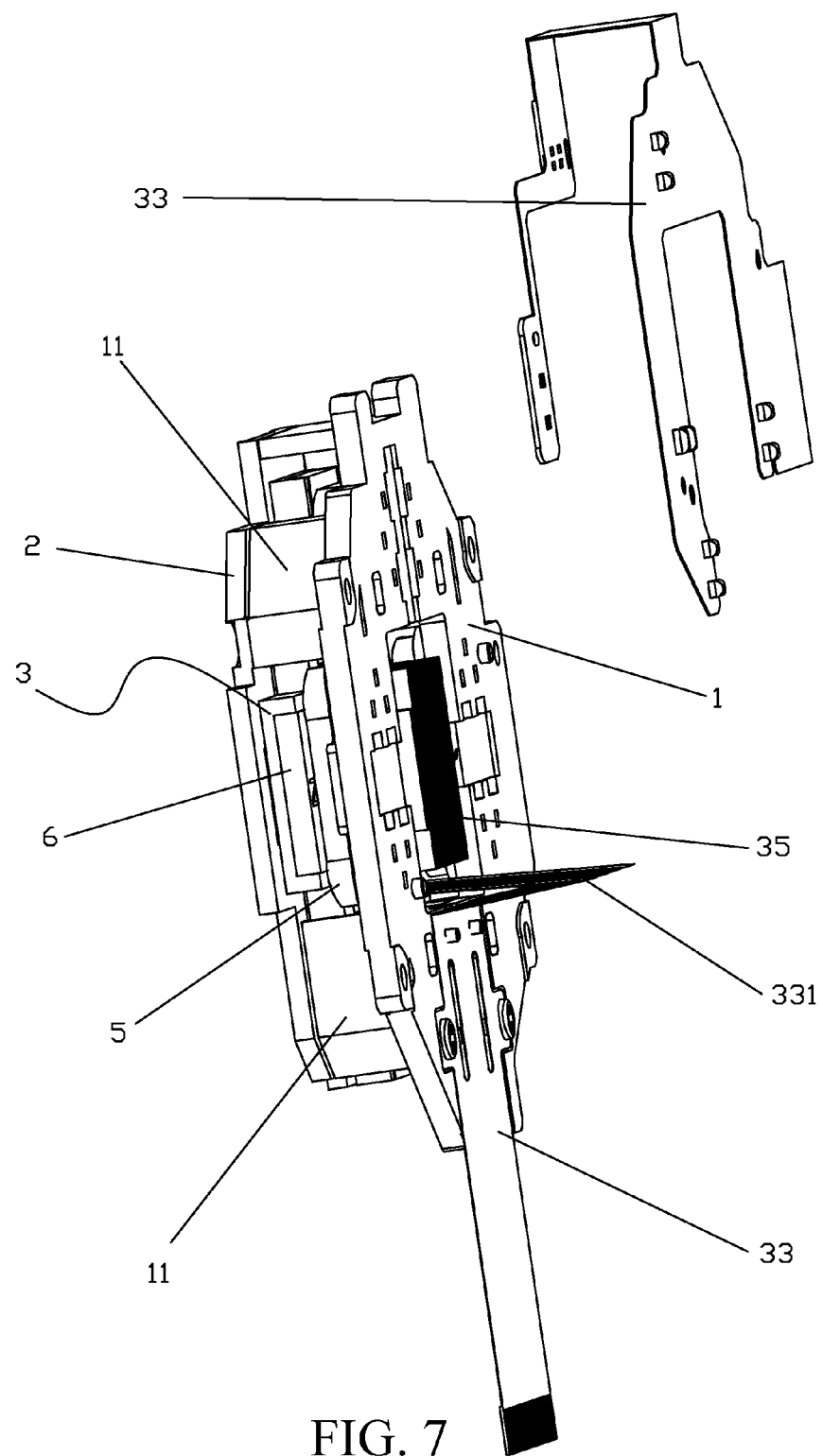
FIG. 7 is a schematic breakdown structural diagram of the present invention.

The following further describes the present invention with reference to the accompanying drawings:

As shown in FIG. 1 to FIG. 7, a novel anti-shake mechanism for a lens includes a movable mechanism 3 that is disposed between a base 1 and a cover 2 and that can move relative to the base 1 and the cover 2. A sensor 4 for sensing a displacement of the movable mechanism 3 is disposed on the cover 2, and the sensor 4 is a Hall component. Two sensors 4 are disposed to respectively sense transverse and longitudinal displacements of the movable mechanism 3. A drive coil 5 is disposed on the base 1 opposite to a front side of the movable mechanism 3. A drive magnet set 6 opposite to the drive coil 5 is disposed on the movable mechanism 3. Action of forces generated between the drive magnet set 6 and the drive coil 5 enables the movable mechanism 3 to move freely on a horizontal plane. A ball 7 that enables the movable mechanism 3 to move relative to the base 1 in a manner of keeping a distance from the base 1 is disposed between the base 1 and the movable mechanism 3. The distance is an axial distance between the movable mechanism 3 and a stack of the base 1 and the cover 2. A floating magnet 8 capable of mutually attracting the drive magnet 6 is disposed on a back side of the base 1, to keep the movable mechanism 3 and the base 1 always abutted against the ball 7. In this way, a certain distance is always kept between the movable mechanism 3 and the base 1, the movable mechanism 3 may slide horizontally relative to the base 1, and the ball 7 between the movable mechanism 3 and the base 1 is used as an intermediate medium to make rolling friction.

A limiting structure 11 for limiting the displacement of the movable mechanism 3 is disposed on the base 1, the limiting structure 11 is a bent convex rib disposed on four corners of the base 1, and the movable mechanism 3 is accommodated in a space enclosed by the four bent convex rib.

A mounting slot 10 for mounting the floating magnet 8 is provided on a back side of the base 1, and the floating magnet 8 is fixed in a dispensing manner after being mounted.

The drive magnet set 6 in the present invention includes two drive magnets, south and north poles of each drive magnet are on two ends of the drive magnet in a thickness direction of the drive magnet, the two drive magnets are disposed side by side with opposite polarities on a same side, south and north poles of the floating magnet 8 are on two ends of the floating magnet 8 in a length direction of the floating magnet 8, and the floating magnet 8 is mounted on a back side of the base 1 in correspondence to the drive magnet set 6.

Further, there are four drive coils 5 and four drive magnet sets 6. In a horizontal movement direction of the movable mechanism 3, the movable mechanism 3 is driven by two drive magnet sets 6 in each direction, and a driving force is greatly increased. Two drive coils 5 in each direction perform driving by using a same sequence current. Correspondingly, there are also four floating magnets 8. The drive coil 5 is between the drive magnet set 6 and the floating magnet 8.

Further, four balls 7 are distributed on the four corners of the base 1 and between two adjacent drive coils 5, so as to keep a certain distance between the drive magnet set 6 and the floating magnet 8, and keep the movable mechanism 3 at a specific fixed position in a height direction.

Further, an exhaust hole 12 is provided at a mounting position for mounting the drive coil 5 on the base 1. During continuous movement, the drive coil 5 is severely heated. Increasing heat dissipation may better improve product performance.

The movable mechanism 3 includes a movable frame 31, a CCD 32 mounted on the movable frame 31, and an FPC 33 connected to the CCD 32. The CCD 32 is disposed on the movable frame 31 by using at least three nuts 30. One of the nuts is a fixed nut for locating a distance between the CCD 32 and the movable frame 31, to ensure a position of a point in a vertical direction. Elastic components 34 capable of adjusting the distance between the CCD 32 and the movable frame 31 are disposed on the rest nuts, so that the rest nuts may be adjusted in the vertical direction. The nuts capable of adjusting the distance are distributed on two sides of the CCD 32, and the three nuts 30 are distributed in a triangle. As a photosensitive component, a requirement on the flatness of the CCD for light rays is relatively high. If an imaging plane of the CCD s inclined, poor imaging is easily caused. A three-point plane adjustment method is used for the three nuts 30 distributed in a triangle: One of the nuts is fixed, and the other two points may be adjusted to adjust inclination of a plane relative to the light rays.

Further, the fixed nut is thread-connected into a protruding hole 311 on the movable frame 31, so that the CCD 32 keeps a distance of the height of the protruding hole 311 from the movable frame 31. The other two nuts are thread-connected into recessed holes 312 on the movable frame 31, and the elastic components 34 are mounted into the recessed holes 312 and are sleeved on the nuts. The elastic components 34 may be pressed tightly and loosened by adjusting the nuts, thereby adjusting the plane of the CCD. After the adjustment, the CCD 32 and the movable mechanism 3 are fixed in a dispensing manner. Preferably, the elastic component 34 is a rubber spring washer.

Further, the CCD generates a lot of heat in a use process, and an overheated CCD easily causes fuzzy imaging, a short service life, or other impacts. Therefore, a heat sink 35 is disposed on the CCD 32, and the heat sink 35 is an aluminum heat sink and fixed on the movable frame 31. Further, a metal plate on the CCD may be coated with a heat-dissipation silica gel layer, to improve heat dissipation performance.

Metal sheets 71 in contact with the ball 7 are respectively disposed on opposite surfaces of the base 1 and the movable mechanism 3, the ball 7 is sandwiched between the upper and lower metal sheets 71, and a surface, in contact with the ball 7, of the metal sheet 71 is coated with a white lubricating layer (that is, white lubricating grease). When rolling friction is made, the lubricating grease produces an effect of reducing abrasion and prolonging a service life. The ball 7 is preferably a ceramic ball. A ball slot 13 is disposed on the base 1. A metal sheet slot 313 is disposed on the movable frame 31 of the movable mechanism 3. The upper and lower metal sheets 71 of the ball 7 are respectively mounted in the ball slot 13 and the metal sheet slot 313. The depth of the ball slot 13 is greater than that of the metal sheet slot 313. When being abutted against the two metal sheets, the ball 7 moves in the ball slot 13 and protrudes from an upper edge of the ball slot 13.

Further, a folded edge 331 for preventing the FPC 33 from being pulled in a use process is pre-folded on the FPC 33. In a movement process of the movable mechanism 3, a buckling force of the FPC 33 may exert disadvantageous influence on the movement of the movable mechanism 3. The folded edge 331 enables the FPC 33 to have a certain pre-folded height, and fixes the FPC 33 onto the base 1, so as to minimize a pulling force in a use process of the FPC 33.

What is claimed is:

1. An anti-shake mechanism for a lens, comprising a movable mechanism (3) that is disposed between a base (1) and a cover (2) and that can move relative to the base (1) and the cover (2), wherein a sensor (4) for sensing a displacement of the movable mechanism (3) is disposed on the cover (2), a drive coil (5) is disposed on the base (1) opposite to a front side of the movable mechanism (3), a drive magnet set (6) opposite to the drive coil (5) is disposed on the movable mechanism (3), a ball (7) that enables the movable mechanism (3) to move relative to the base (1) in a manner of keeping a distance from the base (1) is disposed between the base (1) and the movable mechanism (3), and a floating magnet (8) capable of mutually attracting the drive magnet (6) is disposed on a back side of the base (1);

wherein the drive magnet set (6) comprises two drive magnets, south and north poles of the drive magnet are on two ends of the drive magnet in a thickness direction of the drive magnet, the two drive magnets are disposed side by side with opposite polarities on a same side, and south and north poles of the floating magnet (8) are on two ends of the floating magnet in a length direction of the floating magnet.

2. The anti-shake mechanism for a lens according to claim 1, wherein there are four drive coils (5) and four drive magnet sets (6), and correspondingly, there are also four floating magnets (8).

3. The anti-shake mechanism for a lens according to claim 1, wherein the movable mechanism (3) comprises a movable frame (31), a CCD (32) mounted on the movable frame (31), and an FPC (33) connected to the CCD (32), the CCD (32) is disposed on the movable frame (31) by using at least three nuts (30), one of the nuts is a fixed nut that locates a distance between the CCD (32) and the movable frame (31), and elastic components (34) capable of adjusting the distance between the CCD (32) and the movable frame (31) are disposed on the rest nuts.

4. The anti-shake mechanism for a lens according to claim 1, wherein an exhaust hole (12) is provided at a mounting position for mounting the drive coil (5) on the base (1).

5. The anti-shake mechanism for a lens according to claim 1, wherein a limiting structure (11) for limiting the displacement of the movable mechanism (3) is disposed on the base (1).

6. The anti-shake mechanism for a lens according to claim 1, wherein metal sheets (71) in contact with the ball (7) are respectively disposed on opposite surfaces of the base (1) and the movable mechanism (3), the ball (7) is sandwiched between the upper and lower metal sheets (71), and a surface, in contact with the ball (7), of the metal sheet (71) is coated with a white lubricating layer.

7. The anti-shake mechanism for a lens according to claim 3, wherein the nuts capable of adjusting the distance are distributed on two sides of the CCD (32).

8. The anti-shake mechanism for a lens according to claim 3, wherein a folded edge (331) for preventing the FPC (33) from being pulled in a use process is pre-folded on the FPC (33).

9. The anti-shake mechanism for a lens according to claim 3, wherein a heat sink (35) is disposed on the CCD (32).

* * * * *